United States Patent [19]

Bross et al.

[11] Patent Number: 5,015,857
[45] Date of Patent: May 14, 1991

[54] INFRARED DETECTOR

[76] Inventors: Walter Bross, Konstantin Vanotti Strasse 3B, 7770 Überlingen; Hans Kordulla, Prielstrasse 43, 7776 Owingen; Robert Rid, Drosselweg 9, 7778 Markdorf, all of Fed. Rep. of Germany

[21] Appl. No.: 492,627

[22] Filed: Mar. 13, 1990

[30] Foreign Application Priority Data

Mar. 16, 1989 [DE] Fed. Rep. of Germany ....... 3908627

[51] Int. Cl.$^5$ .............................................. G01J 5/06
[52] U.S. Cl. ..................................... 250/349; 250/332
[58] Field of Search ..................... 250/399, 332, 352; 343/725

[56] References Cited

U.S. PATENT DOCUMENTS

| 4,041,314 | 8/1977 | Oppelt | 250/352 |
| 4,591,717 | 5/1986 | Scherber | 250/338 |
| 4,609,820 | 9/1986 | Miyamoto | 250/338 |
| 4,812,653 | 3/1989 | Comey | 250/352 |
| 4,814,620 | 3/1989 | Comey et al. | 250/352 |
| 4,918,929 | 4/1990 | Chudy et al. | 250/352 |

FOREIGN PATENT DOCUMENTS

| 0198549A2 | 10/1986 | European Pat. Off. |  |
| 2109561 | 9/1972 | Fed. Rep. of Germany. |  |
| 2541818 | 3/1977 | Fed. Rep. of Germany | 250/352 |
| 3632252A1 | 4/1988 | Fed. Rep. of Germany. |  |
| 2198878 | 6/1988 | United Kingdom. |  |

OTHER PUBLICATIONS

Article Titled: Effects of Perturbing Magnetic Fields on the Performance of Photoelectronic Sensors, Rev. Sci. Instrum. 53 (6), 1982, 735-748.

Primary Examiner—Carolyn E. Fields
Assistant Examiner—Drew A. Dunn
Attorney, Agent, or Firm—Lee, Mann, Smith, McWilliams & Sweeney

[57] ABSTRACT

In a multi-element infrared detector a light guide is arranged in front of each detector element, the dimensions of this light guide causing attenuation of radar radiation. Each light guide is formed by a light guiding passage having reflecting and electrically conductive inner walls. The light guiding passages are formed in a passage plate. The surface of the passages are electrically conductive and connected to signal ground. A light stop plate is arranged in front of the passage plate. This light stop plate has light stop apertures in alignment with the light guiding passages. The apertures have non-reflecting inner surfaces. The light stop plate reduces stray radiation.

7 Claims, 4 Drawing Sheets

INFRARED DETECTOR

TECHNICAL FIELD

The invention relates to an infrared detector comprising a plurality of infrared sensitive detector elements, in which infrared detector a plurality of light guides are arranged in front of the detector elements.

BACKGROUND ART

It is known that infrared detectors can be distrubed by electromagnetic radiation, particularly by radar ("Rev. Sci. Instrum 53(6) June 1982, 735-748). Special measures have to be taken for avoiding such disturbances.

It has been attempted to improve the "electromagnetic tolerance" of infrared seeker heads with infrared detector with respect to radar radiation by providing the optical element in the radiation in the path of rays of the seeker head, e.g. a dome or lens, with electrically conductive coatings. Also electrically conductive grid structures have been applied upon the optical elements in the path of rays (DE-A-36 32 252).

Both measures suffer from the disadvantage, that with the attenuation of the radar radiation the radiation utilized in the infrared seeker heads is also attenuated.

From EP-A-0, 198,549 an arrangement for limiting and homogenizing the visual field of detector elements of a mosaic detector is known, wherein the detector elements receive a utilized light flux from an observed visual field. Each of the detector elements is arranged on a cooled carrier in a vessel, which is evacuated or filled with a gas of small thermal conductivity. An arrangement of optical fibers, which are arranged on the cooled carrier and are transparent in the used spectral range, is arranged in the vessel in contact with the detector elements or at a small distance therefrom opposite a window transparent in this spectral range. Indeed these optical fibers serve as light guides for the infrared radiation but do not cause attenuation of radar radiation.

US-A-4,609,820 relates to an image detection device with a detector array for infrared. The influence of the thermal radiation from the environment is to be suppressed by a light stop, such that practically only radiation from the observed visual field impinges upon the detector array. The stray radiation, if it cannot be avoided, should affect the detector evenly over the whole area of the detector. With reference to FIG. 1 of US-A-4,609,820, it is explained that the radiation in the middle of an array detector is more intense than at the ends. According to the teaching of US-A-4,609,820 the light stop forms a grid-shaped shielding body for homogenizing the radiation over the length of the detector array. This grid structure has no light guiding function. DE-B-25,41,818 and DE-B-21,19,501 show an infrared radiation detector for homing heads. This infrared radiation detector has a single detector element. This detector element is arranged in a Dewar vessel. A rotating visual field is generated in an image plane by an imaging system comprising a concave mirror facing the visual field and a plane mirror, which receives the rays reflected from the concave mirror. A modulator disc is located in the image plane. The radiation passing through the modudlator disc is guided upon the detector element by a field lens and a conic radiation guide.

GB-A-2,198,878 shows a pyroelectric radiation detector, in which the surface exposed to radiation of a detector element made of radiation-sensitive material is provided with a radiation-absorbing electrode. The radiation-absorbing electrode has cutouts, which are in alignment with grooves in a radiation-sensitve material. The grooves have radiation-absorbing side walls. The depth of the grooves is in the order of mangitude of the wave length of the radiation to be detected. The width of the grooves is similarly dimensioned.

US-A-4,591,717 shows an infrared detector comprising a vacuum tube, in which a photosensitive layer is provided. The photosensitive layer has needles in the form of metal whiskers. These needles are closely packed and arranged perpendicular to a substrate.

DISCLOSURE OF THE INVENTION

It is the object of the invention to provide an infrared detector, in which an attenuation of radar rays is achieved without corresponding atttentuation of the utilized infrared radiation.

According to the invention of this object is achieved in an infrared detector of the type mentioned at the beginning in that the light guides are formed by passages with reflecting and electrically conductive inner walls, the dimensions of said passages causing attenuation of radar radiation.

Radar radiation is strongly attenuated, when it enters apertures with electrically conductive surfaces and the dimensions of these apertures are smaller than the wave length of the radar radiation. The attenutation increases with increasing ratio of wave length to dimensions of the aperture. The attenuation also increases with increasing depth of the aperture. The dimensions of a detector element of an infrared detector usually lie between 30μm and 200μm. The cross-sections of the light guides must be in the same order of magnitude. These dimensions are only a fraction of the wave lengths of conventional radar devices. Therefore, very high attenuation of more than 80 dB of the radar radiation can be effected by such light guides with sufficient depth. The infrared radiation, however, is guided upon the detector elements by the light guides and thereby is attenuated only slightly.

Modifications of the invention are subject matter of the sub-claims.

An embodiment of the invention will now be described in greater detail with reference to the accompanying drawings.

PREFERRED EMBODIMENT OF THE INVENTION

The numeral 10 designates a Dewar vessel. The dewar vessel 10 has a pot shaped inner portion 12 and an outer portion 14, also pot shaped, surrounding this inner portion. Inner portion 12 and outer portion 14 are connected at their edges in a usual way not shown in FIG.

Figure 1:
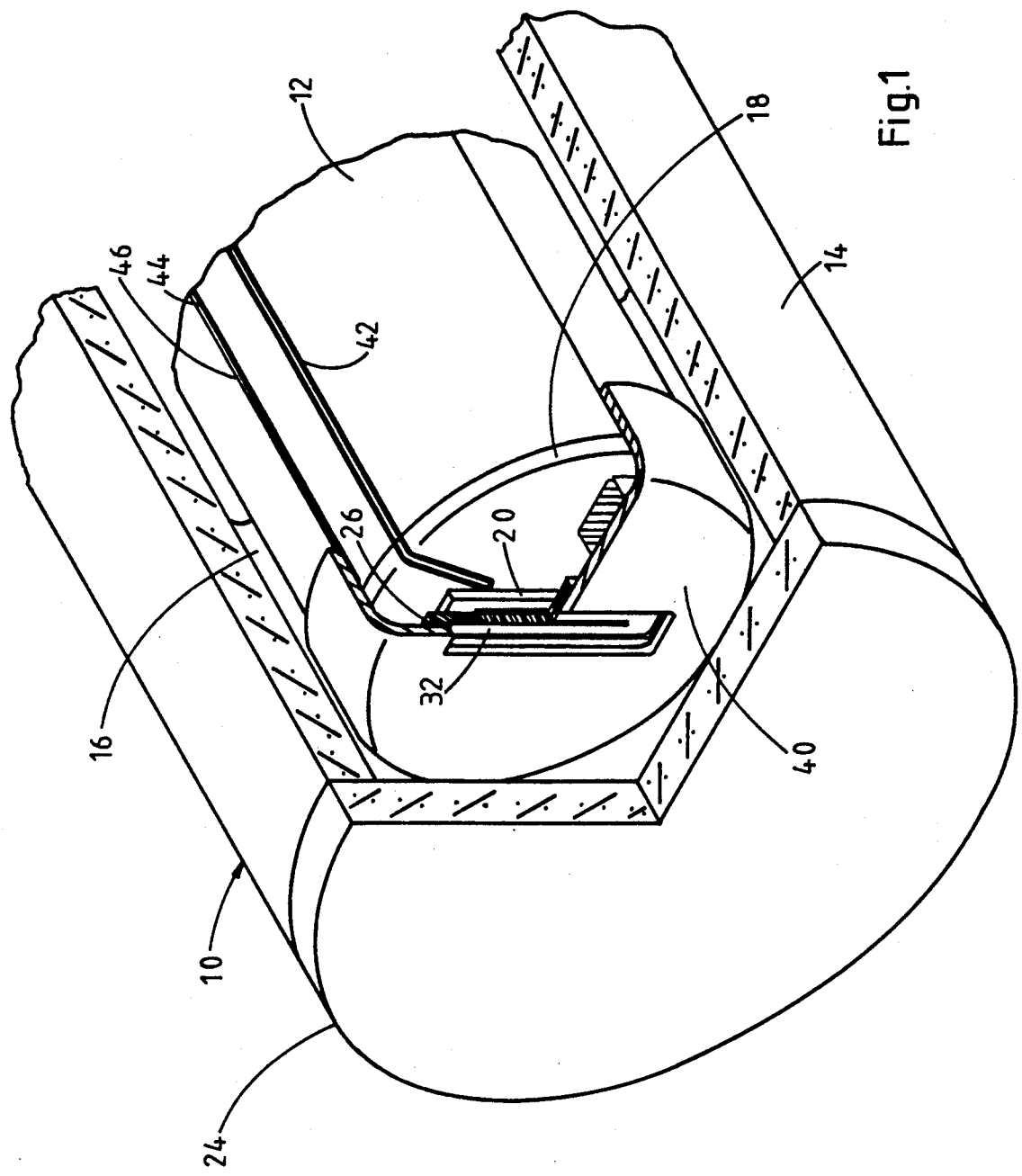
FIG. 1 is a partial sectional perspective illustration of the front part of a multi-element infrared detector.
Figure 2:
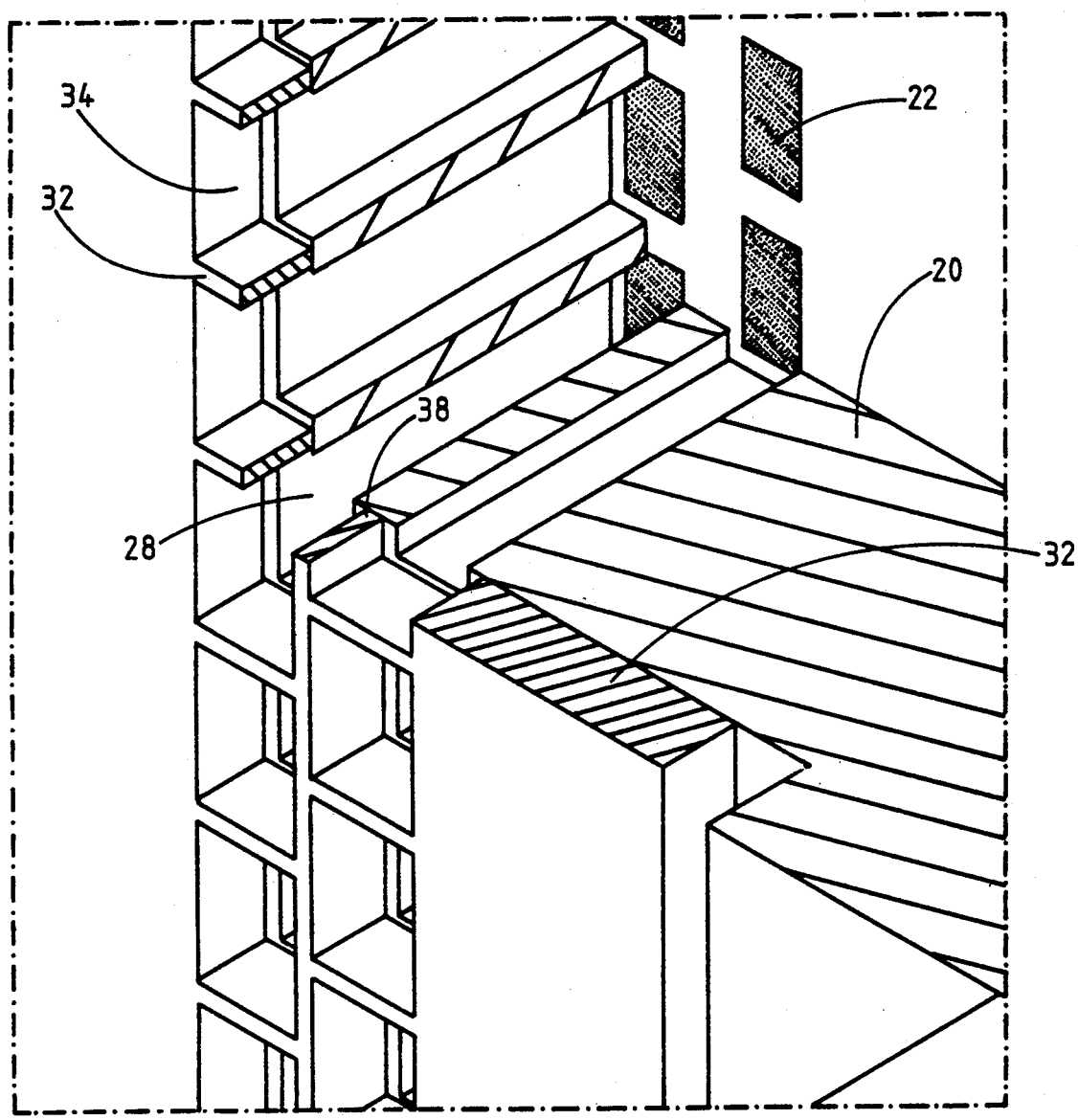
FIG. 2 is an enlargement of the area "Z" in FIG. 1 and shows details of the multi-element infrared detector with light guides and a light stop plate.

1. Thus an annulus 16 is formed which is evacuated for heat insulation. Inside the inner portion 12 a cooler (not illustrated) is located, by which particularly the front wall 18 of the inner portion 12 is cooled. This front wall 18 forms a substrate for an integrated component or chip 20 with a raster of detector elements 22 (FIG. 2). The chip 20 is located on the outside of the end wall 18 facing the outer portion 14 and is cooled by the cooler through this end wall. The end wall 24 of the outer portion 14 is formed by a window transparent to infrared radiation. If it is used in a seeker head, a visual field image of a visual field to be detected by the seeker head is generated in the area of chip 20 with the detector elements 22.

A passage plate 26 with a plurality of light guiding passages 28 is located in front of the chip 20 with the detector elements 22. Such a straight light guiding passage 28 is associated to each detector element 22 of the chip 20. The light guiding passages 28 are aligned with the detector elements 22 and approximately conform, in their cross sections, to the shape of the detector elements. The passages 28 are open and are provided with reflecting and electrically conductive layers 30 (FIG. 3 and 4) on their walls. In the described embodiment the light guiding passages 28 have rectangular cross sections, as can be seen from FIGS. 2 to 4.

A light stop plate 32 is located in front of the passage plate 26. The light stop plate 32 has a plurality of light stop apertures 34 in the form of rectangular apertures. Such a light stop aperture is provided for each detector element 22. The light stop apertures 34 are in alignment with the light guiding passages 28. But the light stop apertures 34 are a little larger than the cross sections of the light guiding passages 28. The inner walls 36 (FIG. 3 and 4) of the light stop apertures 34 are blacked and therefore non-reflecting.

The passage plate 20 and the light stop plate 32 are electrically and heat conductively connected on the surface 38. The electrically conductive surface of the passage plate 20 is connected to signal ground. Besides, the passage plate 20 and the light stop plate 32 are electrically and heat conductively connected to a connecting body in the form of a pot-shaped cap 40. The cap 40 is located on the closed end of the inner portion 12. The signal paths 42 of the detector elements run on the inner portion 14. Then these signal paths 42 are covered by an insulating layer 44. An electrically conductive layer 46 is applied to the insulating layer 44. The cap 40 is connected to the layer 46 in an electrically conductive way.

A visual field image is formed in a plane 48, which is located inside the light stop plate 32 and the light stop aperture 34.

Figure 3:
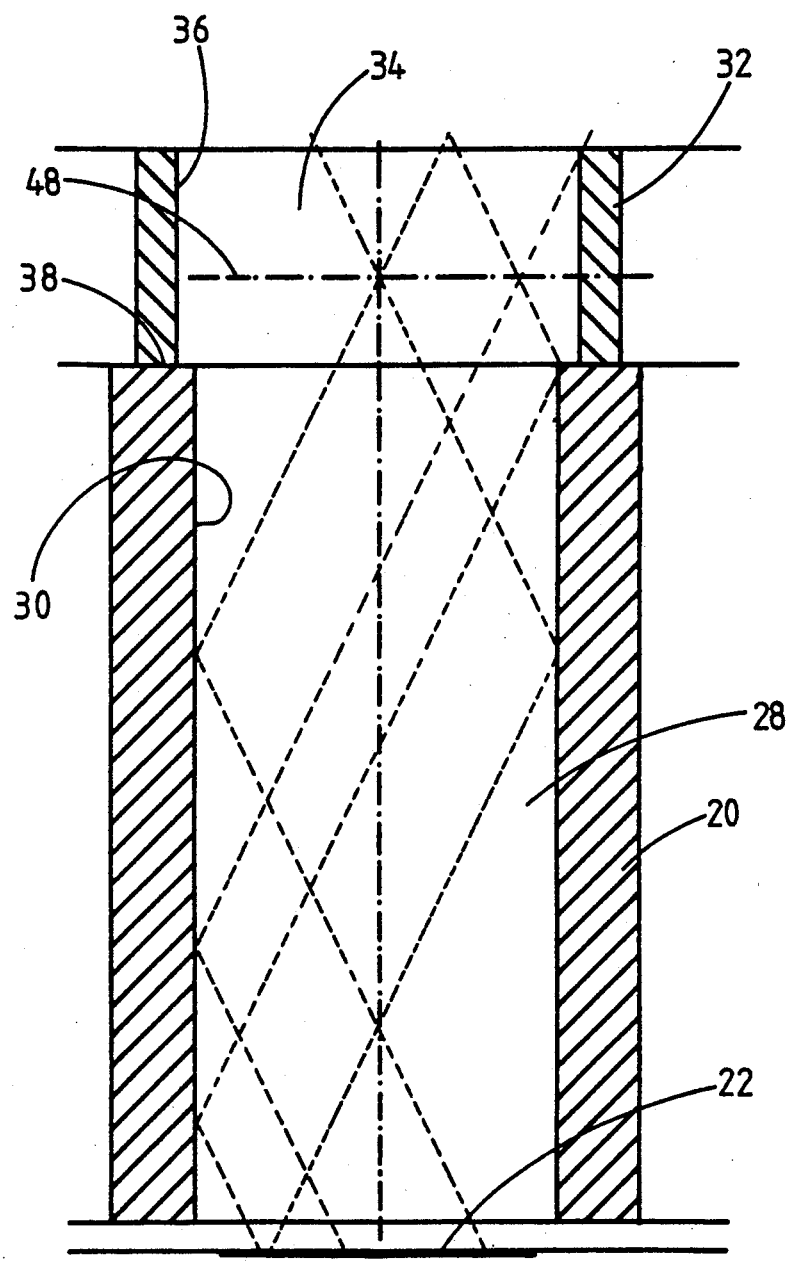
FIG. 3 is a sectional view taken along a side wall of a light guiding passage and a light stop aperture of the light stop plate.
Figure 4:
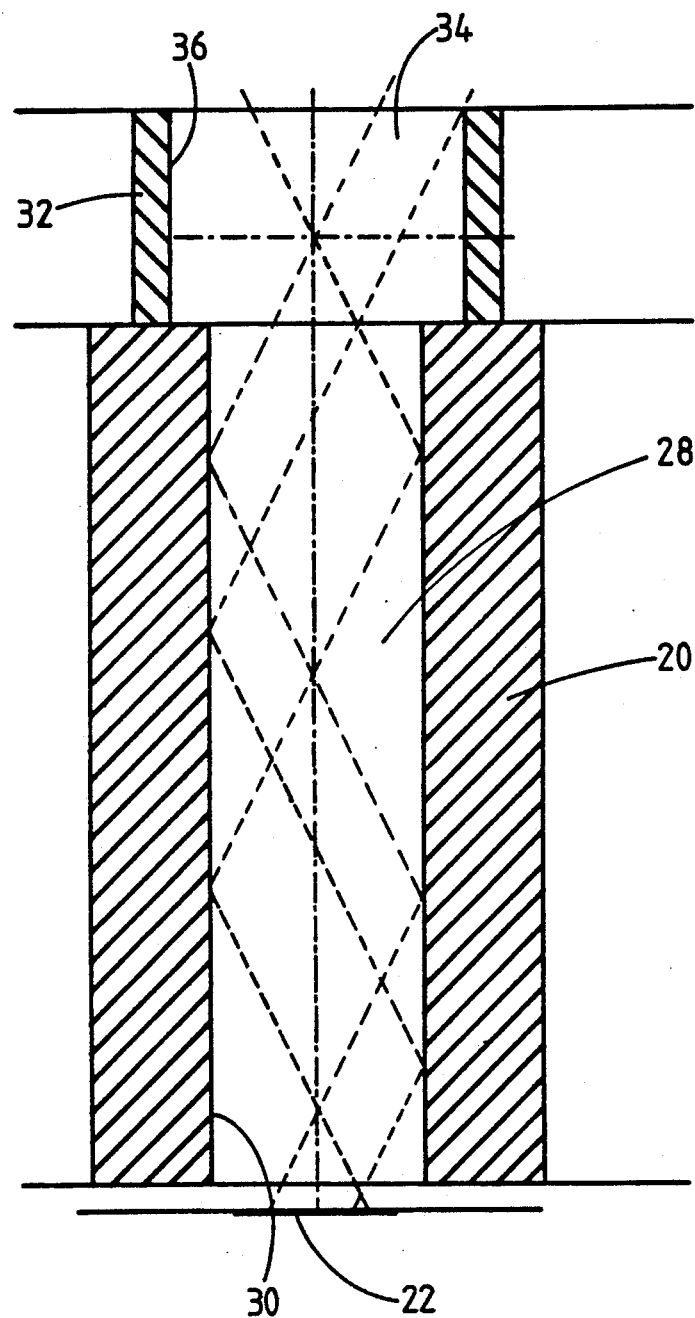
FIG. 4 is a sectional view taken along a broadside of the light guiding passage and the light stop aperture.

A strong attenuation of the incident radar radiation occurs such that practically no radar radiation becomes effective at the detector elements 22. In contrast to this, the infrared radiation of the image elements of the visual field image generated in the plane 48 is guided, as indicated in FIG. 3 and 4, upon the detector element 22. The blacked light stops in the light stop plate 32 act as cold light stops and reduce the stray radiation incident sidewise, such that essentially utilized radiation impinges upon the detector elements 22.

We claim:
1. An infrared detector comprising
    an array of infrared sensitive detector elements arranged side-by-side on a substrate,
    a passage plate arranged in front of said array of infrared sensitive detector elements and having straight passages therethrough,
    each of said detector elements having an associated one of said passages aligned therewith,
    the walls of said passages having reflecting and electrically conductive surfaces, which are connected to signal ground, said passages guiding infrared radiation entering at their front ends to the respective detector elements by reflection at said reflecting surfaces,
    the apertures and lengths of said passages being selected to cause attenuation of radar radiation in said passages such that virtually no radar radiation becomes effective at said detector elements.
2. An infrared detector as claimed in claim 1, wherein the largest dimensions of the apertures of said passages are smaller than the wave length of radar radiation.
3. An infrared detector as claimed in claim 1 wherein said passages have cross sections which substantially conform to the shape of the associated detector element.
4. An infrared detector as claimed in claim 1 and further comprising a light stop plate arranged in front of said passage plate and having light stop apertures with non-reflecting inner walls, said light stop apertures being aligned with said passages.
5. An infrared detector as claimed in claim 3, wherein said light stop apertures are larger than the apertures of said passages.
6. An infrared detector as claimed in claim 4, wherein said light stop plate is electrically connected with said aperture plate.
7. An infrared detector as claimed in claim 1 and further comprising:
    a Dewar vessel having a pot-shaped inner portion and a pot-shaped outer portion surrounding said inner portion at a distance, said inner portion and said outer portion being connected along their edges to form a cavity therebetween,
    said array of infrared snesitive detector elements, said passage plate and said light stop plate being supported on the end wall of said inner portion facing said outer portion, the end wall of said outer portion being formed by a window of infrared-transparent material,
    signal paths provided on the outer surface of said inner portion and connected to said detector elements and an insulating layer applied to said outer surface of said inner portion and covering said signal paths,
    an electrically conductive layer covering said insulating layer, and
    a connecting element electrically connected with both said passage and light stop plates and said conductive layer.

* * * * *